US007949295B2

(12) United States Patent
Kumar et al.

(10) Patent No.: US 7,949,295 B2
(45) Date of Patent: May 24, 2011

(54) AUTOMATED TRAINEE MONITORING AND PERFORMANCE EVALUATION SYSTEM

(75) Inventors: Rakesh Kumar, Monmouth Junction, NJ (US); Aydin Arpa, Jacksonville, FL (US); Hui Cheng, Bridgewater, NJ (US); Vincent Paragano, Yardley, PA (US); Keith J. Hanna, Princeton Junction, NJ (US)

(73) Assignee: SRI International, Menlo Park, CA (US)

( * ) Notice: Subject to any disclaimer, the term of this patent is extended or adjusted under 35 U.S.C. 154(b) by 431 days.

(21) Appl. No.: 11/206,678

(22) Filed: Aug. 18, 2005

(65) Prior Publication Data

US 2006/0073449 A1    Apr. 6, 2006

Related U.S. Application Data

(60) Provisional application No. 60/602,355, filed on Aug. 18, 2004, provisional application No. 60/673,163, filed on Apr. 20, 2005.

(51) Int. Cl.
*G09B 5/00* (2006.01)
*G09B 9/00* (2006.01)
*G06F 17/00* (2006.01)

(52) U.S. Cl. ............ 434/307 R; 434/1; 434/21; 434/76; 434/247; 434/308; 434/323; 434/325; 345/418; 345/441

(58) Field of Classification Search .................. 434/247, 434/362, 1, 21, 76, 308, 307 R, 323, 325, 434/350; 482/1, 4, 8; 345/418, 441
See application file for complete search history.

(56) References Cited

U.S. PATENT DOCUMENTS

| | | | | |
|---|---|---|---|---|
| 5,489,249 A * | 2/1996 | Brewer et al. | ..... | 482/5 |
| 5,577,981 A * | 11/1996 | Jarvik | ..... | 482/4 |
| 5,759,044 A | 6/1998 | Redmond | | |
| 5,823,779 A | 10/1998 | Muehle et al. | | |
| 5,836,770 A * | 11/1998 | Powers | ..... | 434/247 |
| 5,850,352 A | 12/1998 | Moezzi et al. | | |
| 5,852,672 A * | 12/1998 | Lu | ..... | 382/154 |
| 5,868,578 A | 2/1999 | Baum | | |
| 5,882,204 A * | 3/1999 | Iannazo et al. | ..... | 434/251 |
| 5,982,352 A | 11/1999 | Pryor | | |
| 6,016,150 A * | 1/2000 | Lengyel et al. | ..... | 345/426 |
| 6,078,329 A * | 6/2000 | Umeki et al. | ..... | 345/419 |
| 6,232,974 B1 * | 5/2001 | Horvitz et al. | ..... | 345/419 |
| 6,430,997 B1 * | 8/2002 | French et al. | ..... | 73/379.04 |
| 6,458,060 B1 * | 10/2002 | Watterson et al. | ..... | 482/54 |
| 6,579,097 B1 * | 6/2003 | Sampson et al. | ..... | 434/21 |
| 6,765,565 B2 * | 7/2004 | Sayers et al. | ..... | 345/418 |
| 6,786,730 B2 * | 9/2004 | Bleckley et al. | ..... | 434/247 |
| 6,795,090 B2 * | 9/2004 | Cahill et al. | ..... | 345/646 |
| 6,796,927 B2 * | 9/2004 | Toyama | ..... | 482/8 |
| 6,811,264 B2 * | 11/2004 | Raskar et al. | ..... | 353/94 |
| 6,881,067 B2 * | 4/2005 | Tarry | ..... | 434/247 |
| 6,902,513 B1 * | 6/2005 | McClure | ..... | 482/8 |
| 6,905,339 B2 * | 6/2005 | DiMare et al. | ..... | 434/247 |
| 7,133,052 B1 * | 11/2006 | Silva | ..... | 345/646 |
| 7,384,158 B2 * | 6/2008 | Ramachandran et al. | ..... | 353/70 |
| 7,663,640 B2 * | 2/2010 | Nayar et al. | ..... | 345/589 |
| 2001/0001303 A1 * | 5/2001 | Ohsuga et al. | ..... | 482/5 |
| 2002/0140708 A1 * | 10/2002 | Sauer | ..... | 345/633 |

(Continued)

*Primary Examiner* — Xuan M Thai
*Assistant Examiner* — Kang Hu
(74) *Attorney, Agent, or Firm* — Lowenstein Sandler PC

(57) ABSTRACT

A method and system for performing automated training environment monitoring and evaluation. The training environment may include a mixed reality elements to enhance a training experience.

17 Claims, 5 Drawing Sheets

U.S. PATENT DOCUMENTS

| | | | |
|---|---|---|---|
| 2003/0032484 A1* | 2/2003 | Ohshima et al. | 463/43 |
| 2004/0113887 A1* | 6/2004 | Pair et al. | 345/156 |
| 2004/0146840 A1* | 7/2004 | Hoover et al. | 434/21 |
| 2005/0272011 A1* | 12/2005 | Herman et al. | 434/11 |
| 2005/0275626 A1* | 12/2005 | Mueller et al. | 345/156 |
| 2006/0048092 A1* | 3/2006 | Kirkley et al. | 717/100 |

* cited by examiner

AUTOMATED TRAINEE MONITORING AND PERFORMANCE EVALUATION SYSTEM

CROSS-REFERENCE TO RELATED APPLICATIONS

This application claims benefit of U.S. provisional patent applications Ser. No. 60/602,355, filed Aug. 18, 2004, and Ser. No. 60/673,163, filed Apr. 20, 2005, which are herein incorporated by reference.

BACKGROUND OF THE INVENTION

1. Field of the Invention

Embodiments of the present invention generally relate to training systems and, in particular, to monitored training systems.

2. Description of the Related Art

The purpose of training systems used for military, sports, and employee training is achieving in a trainee a mode of desired behavior through specialized instructions and practice. To be efficient, such systems should provide realistic environment for training exercises and be adaptive to training objectives and a degree of trainee's performance, which requires real-time feedback on trainee's actions and flexibility in injecting different but repeatable stimuli.

Present training systems do not possess these characteristics and typically offer schematic versions of real-world environment and simplified models of training objects, such as pre-painted 2D landscapes, pop-up cardboard targets, and the like. However, increasing complexity of training scenarios, for example, in military training, requires immersing the trainee in realistic and adaptive training environment. Furthermore, trainee monitoring and feedback is generally limited to trainer observation followed by trainer critique. Such monitoring and feedback techniques are very subjective, not repeatable and fraught with error.

Therefore, there is a need in the art in an improved trainee monitoring and performance evaluation system.

SUMMARY OF THE INVENTION

The present invention provides an automated system for creating a monitored training environment. The training facility and trainees are comprehensively monitored using automated processes throughout the training exercise. The data acquired from the exercise is indexed and stored for comparison and feedback. A closed loop training system is created where the trainee's actions are tracked and his/her performance is measured. Based on the trainee's performance, the training environment is modified to improve performance in weak areas. The invention may be used in military training, sports training, employee training, and the like.

In one embodiment, images of synthetic objects are displayed to trainees using see-through augmented reality glasses or projection (stereo-graphic or monocular that forms on arbitrary surfaces in the physical scene to create an augmented mixed-reality training environment. The user sees both the real world and the synthetically created objects and opposing forces (OpFors) as one coherent scene. A training scenario may be modified based on measured metrics of trainee(s)' performance during the training session and/or historical data.

BRIEF DESCRIPTION OF THE DRAWINGS

The teachings of the present invention will become apparent by considering the following detailed description in conjunction with the accompanying drawings, in which.

DETAILED DESCRIPTION OF THE PREFERRED EMBODIMENT

The present invention is a method and system for facilitating interactive training environment, which advantageously address deficiencies of the prior art and may be used in military training, sports training, employee training, and the like.

Figure 1:
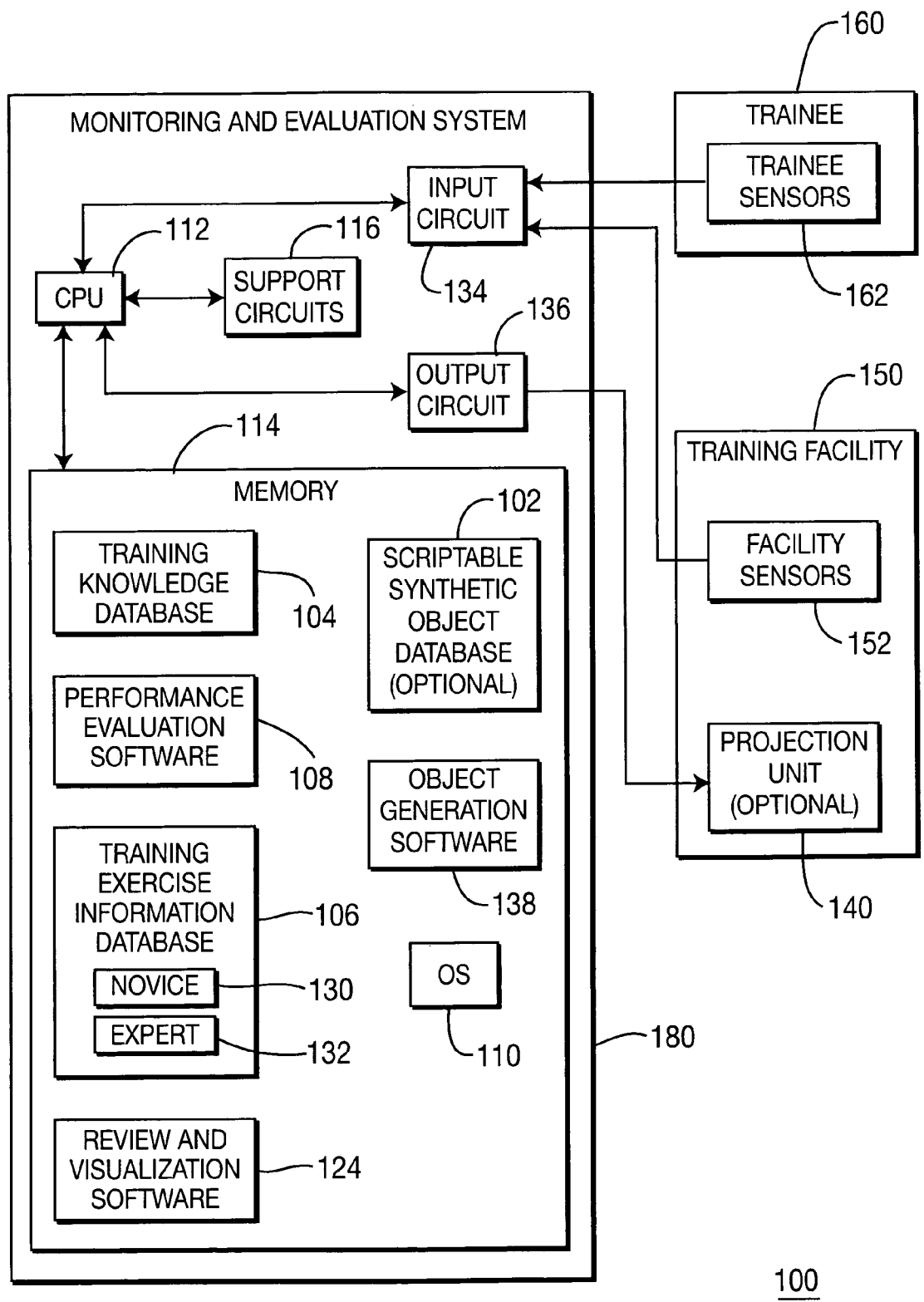
FIG. 1 depicts a block diagram of an exemplary system of a kind that may be used for facilitating interactive training environment in accordance with one embodiment of the present invention

FIG. 1 depicts a block diagram of an exemplary system 100 for creating a monitored training environment for trainees 160 in accordance with one embodiment of the present invention. In the context of the present invention, a trainee 160 is an individual or an apparatus (e.g., vehicle, tank, boat, and the like) operated by the individual or a group of such individuals (e.g., a crew) or apparatuses, which participate in training exercises performed using the system 100. Hereafter, the term "trainee" is collectively used in reference to a training individual and a group of such individuals. During a training session, a trainee is tracked with one or more tracking sensors 162 (e.g., visible markers, infrared markers, inertial navigation sensors (INSs), video cameras, microphones, radio-frequency tags (RFIDs), and the like), which monitor location, poses, and actions of the trainee. The trainee 160 may also be outfitted with biometric sensors to measure breathing, heart rate, perspiration, blood pressure, and the like. Furthermore, in addition to monitoring the trainee 160, the training facility 150 is comprehensively monitored by a variety of sensors 152. An exemplary training facility is described with respect to FIG. 4 below.

The system 100 illustratively comprises a monitoring and evaluation system 180, trainee sensors 162, a training facility 150, and facility sensors 152. The training facility may be optionally outfitted with one or more projection units 140 to create a mixed reality training environment where a trainee may experience real objects as well as synthetic objects within the training facility 150. A discussion of a process for creating synthetic objects is discussed with respect to FIG. 5 below.

The monitoring and evaluation system 180 comprises a central processing unit (CPU) 112, a memory 114, input circuit 134, output circuit 136 and support circuits 116. The CPU 112 may be one or more of any form of computer processor, microprocessor, microcontroller, and the like. The input circuit provides support for data from a variety of trainee sensors 162 and facility sensors 152. The input circuits 134 may provide data preprocessing such as noise reduction and filtering. The output circuit 136 provides data (imagery) to the projection unit 140.

The memory 114, or computer readable medium, may be one or more of readily available memory, such as random access memory (RAM), read-only memory (ROM), flash memory, a floppy disk, a hard or optical drive, or any other form of digital storage, local or remote. The support circuits 116 are coupled to the CPU 112 for supporting the processor in a conventional manner. These support circuits may comprise cache, power supplies, clock circuits, subsystems, and the like.

The memory 114 comprises an operating system (OS) 110, a training knowledge database 104, performance evaluation software 108, a training exercise information database 106, review and visualization software 124, optional scriptable synthetic object database 102 and optional synthetic object generation software 138. The operating system is a conventional operating system that facilitates operation of the CPU 112. Such operating systems include WINDOWS, AIX, LINUX, and the like.

The database 104 contains information relating to objectives of the training, such as performance metrics, training strategies, models of behavior of the trainees, models of trainee's reactions to events in the training environment. This information may be represented using a set of event ontologies. For example, in military training, event ontology is used to capture doctrines, tactics and techniques of military operations (e.g., how to hold a weapon, where to point the weapon when entering a room being searched, and the like). For sports training, such as tennis, the event ontology may relate, e.g., to a correct posture for serving and swing. The database 104 selectively provides performance metrics and event ontology to the performance evaluation software 108 for measuring the trainee's performance and to the database 106 for capturing, storing and indexing the information acquired during training exercises.

The database 106 contains real-time and historic data associated with the training exercises administered using the system 100. Such data generally includes listings and annotated descriptions of the scriptable synthetic objects and available training scenarios, indexed sensor data, listings of simulated events and their timing during the training sessions, trainee's performance metrics, trainee's IDs, settings for the projection unit 140, and the like. The database 106 may comprise novice information 130 containing training results from novice trainees, and expert information 132 containing training results from experts in performing particular training exercises. With this information, novice trainees can be compared to the experts to provide performance feedback.

The performance evaluation software 108 performs automatic evaluation of trainee's performance during the training exercises and provides real-time feedback to the database 102 for adjusting the training scenario to achieve objectives of the training session. In operation, the software 108 facilitates implementation of flexible and interactive training strategies and close-loop controls in the system 100. In one embodiment, evaluated performance criteria include trainee's positions, positions of trainee's body parts, positions of equipment operated by the trainee (e.g., weapons, vehicles, tools, sports equipment, or other objects of interest), positions of the scriptable synthetic objects relative to landmarks of the training environment, commands to and verbal responses from the trainee, acoustic environment during the training session, and the like. Performance evaluation is accomplished by analyzing historic information available from the database 104 and the real-time data collected by the sensors 162. The performance of novices is compared to the performance of experts to develop metrics.

The review and visualization software 124 provides tools for performing after-action review and visualization of results of the training sessions. In one embodiment, such tools include a query engine and a web-based reporting system (both not shown). The queries may be used for instructing the trainees prior to the training exercises, as well in reviewing the results of the performed training sessions with participated and/or perspective trainees, either on-site or at remote facilities. The reporting system generally normalizes and annotates the results of the training sessions by aligning multiple events with the timeline. Such events and corresponding annotations may automatically be generated by the software 124 or selectively provided/updated by an operator, during or after the training session.

The database 102 contains a library of training landscapes, computer-generated scriptable synthetic objects and opposing forces (OpFors). Collectively these synthetic images are referred to as synthetic objects. Scriptable synthetic objects are generally static or animated images of targets, opponents, obstacles, and the like objects that may be interactively integrated in the physical real world walls and surfaces of the buildings used in the training scenarios, thus developing computer-generated mixed-reality training situations. During training sessions, such training scenarios or portions thereof are displayed, in a pre-determined order, using the projection unit 140 based on the actions of the trainee. Object generation software 138 accesses and renders the synthetic objects for display. The data representing the objects is coupled to the projection unit 140 for display. The software 138 interacts with the databases 102, 104, 106 to create a scripted set of objects that interact with the trainee's. The objects can be varied during the training exercise to improve the performance on the trainee.

In one embodiment, the projection unit 140 is a stereo graphic or monocular projection unit that creates and displays 2D/3D images of the synthetic objects that are mixed in with the real world scene. During a training session, for trainees participating in the training exercises, the projection unit 140 generates an augmented mixed-reality training environment. Some training scenarios may also require the trainees use specialized eyewear, such as stereo-enabled shuttered glasses, and the like. Alternatively, the users may wear see-through glasses where light from the physical world is mixed with computer generated imagery. Finally, if the scene is completely synthetic than they may wear computer glasses and helmets which completely immerse them into a synthetic training facility.

Generally, the projection unit 140 may comprise one or more stereo-enabled digital light processing (DLP) projector or a fast-phosphor green cathode rays tube (CRT) projector and a Z-type screen, two CRT or DPL projectors each provided with a polarization lens, or two internally polarized or shuttered liquid crystal display (LCD) projectors, as well as may use structured light. In one embodiment, the projection unit 140 comprises feedback camera sensors to measure geometric and reflective properties of the arbitrary surfaces in the training facility 150 and compensate for color, texture, and form factor of the facility's surface, as well as develop a seamless geometrically integrated image from portions displayed by component projectors of the unit 140. The projection unit 140 represents one technique for introducing a synthetic object into a training scenario. Holographic projection, stereo-enabled shuttered glasses, and the like may also be used.

Figure 5:
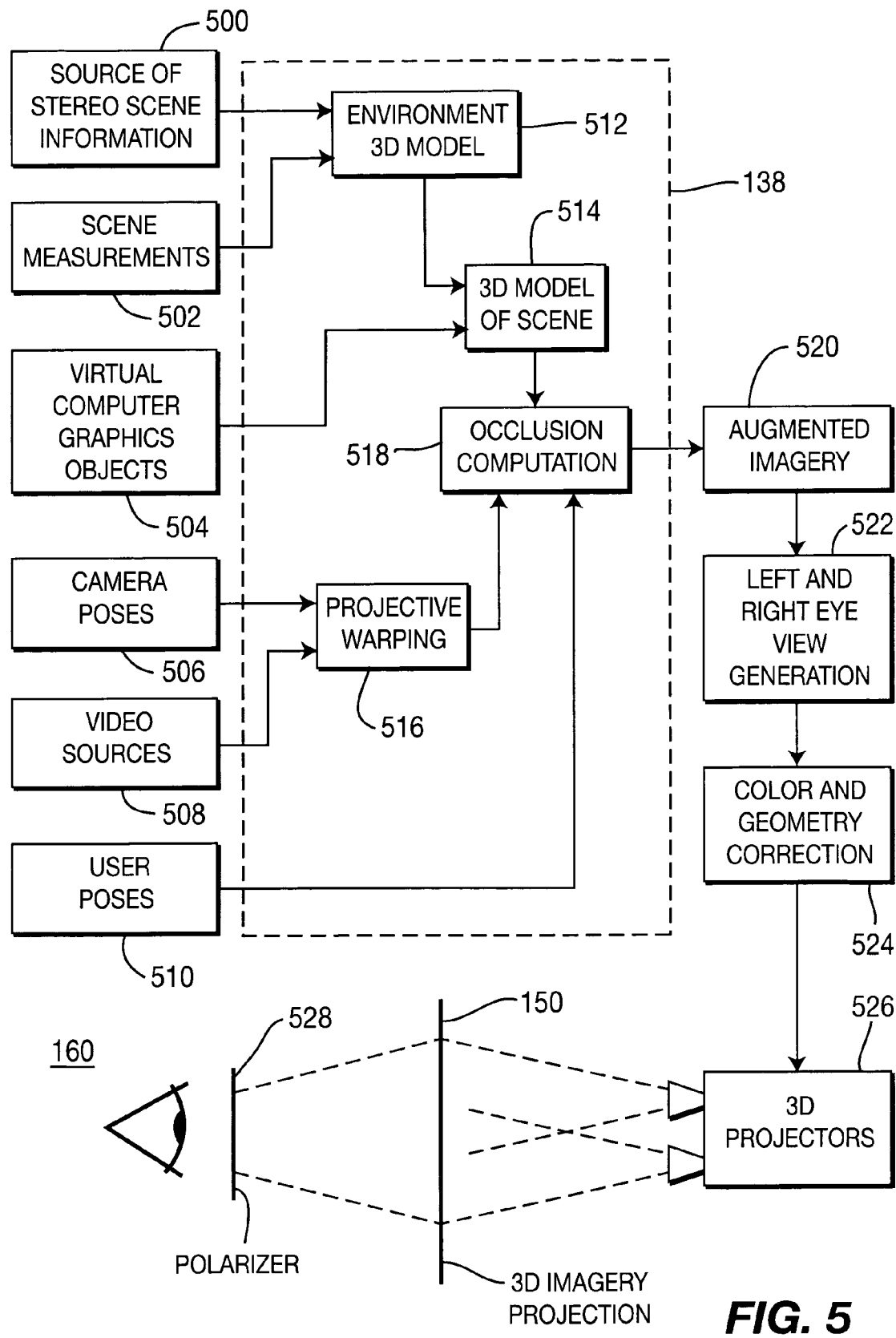
FIG. 5 depicts a block diagram of a projection unit for providing a mixed reality scenario to the training environment The appended drawings illustrate exemplary embodiments of the invention and, as such, should not be considered limiting the scope of the invention that may admit to other equally effective embodiments.

FIG. 5 depicts a functional block diagram of the object generation software 138 and an exemplary projection unit 140. The software 138 utilizes a stereo scene information 500 and scene measurements 502 to create a three dimensional model of the environment of the training facility, e.g., a model of the room in which the unit 140 is to be placed. If desired, virtual computer graphics 504 can be added to the model 512 to produce a three dimensional model of a scene 514.

The video 508 and camera poses 506 for cameras that create the imagery to be added are processed using projective warping 516. This process creates video imagery that can be manipulated to fit a desired view. User pose 510, e.g., the trainee's position and view of the projection unit 140, is coupled to an occlusion computation 518. The warped image 516 and the 3D model 514 are also applied to the occlusion computation 518 to create a view of the imagery within the scene from the point of view of the trainee. This view is the augmented imagery 520.

The augmented imagery 520 is processed to form left and right eye views using a view generator 522. Color and geometry correction is performed at block 524 and the imagery is applied to 3D projectors 526. The image is displayed on a walls and other surfaces 150 (or, in other embodiments, on goggles, holographically, and the like). The trainee 160 wears polarizing glasses or shuttered glasses 528 to achieve a 3D view of the projected image within the "real" room. Thus, an augmented mixed reality scenario is created.

Figure 2:
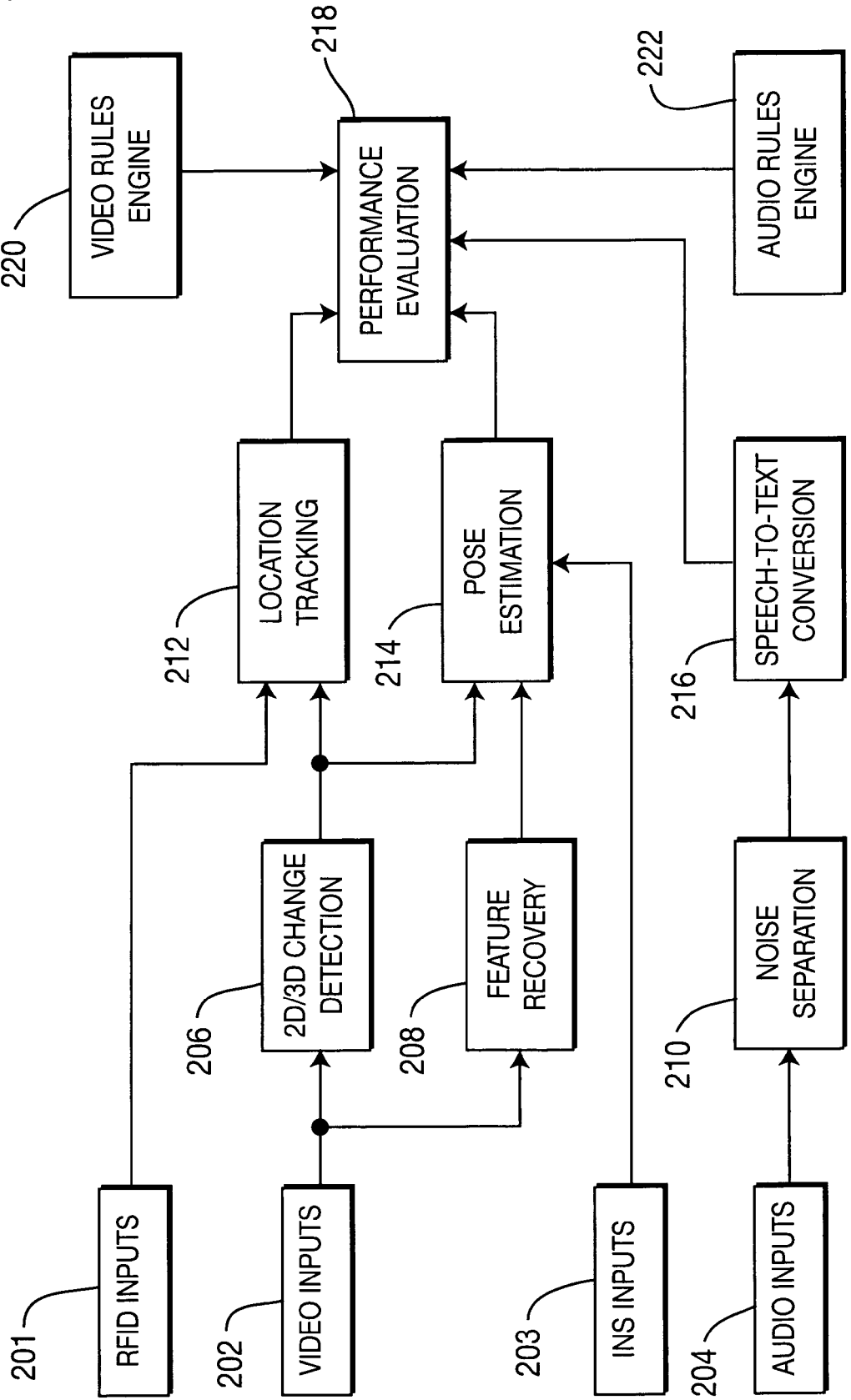
FIG. 2 depicts an exemplary block diagram of a performance evaluation module of the system of FIG. 1.

FIG. 2 depicts a functional block diagram of the performance evaluation software 108 of the system 100 of FIG. 1. In the depicted embodiment, the software 108 comprises a plurality of RFID, video, INS, and audio inputs 201-204 for the sensor data extracted, using the input circuit 122, from the respective sensors 162. Video and audio inputs (e.g., from multiple cameras and microphones) are processed to produce raw real-time location information (2D/3D change detection module 206 and feature recovery module 208) and audible information (noise separation module 210) about the exercising trainee, events, and environment during the training session.

A video component of the raw information is processed, along with data from the INS input 203, using a location tracking module 212 and a pose estimation module 214 to define details of trainee's posing and positioning and/or location of equipment operated by the trainee during specific phases of the training session. In analysis of the video data, landmark recognition may be used to refine 2D/3D positions of the trainees and objects of interest, as well as to correct drift errors associated the INSs. In one embodiment, the module 108 monitors movements, poses, and positions of each trainee. Advanced stereo video processing may be used, within the constrains of body-articulated model of human motion, to recover, for example, positions and poses of a head, torso, legs, and arms, as well as positioning of the trainee relative to the objects of interest.

An audio component of the raw information is processed in a speech-to-text module 216 that converts this information in a text domain to facilitate its comparability with other audible records. Generally, the module 216 detects common words and phrases (e.g., commands, reports, and the like) used during the training exercises to produce corresponding textual annotations.

Processed video and audio components of the information are analyzed in a performance evaluation module 218 along with performance metrics comprising video data stored in a configurable video rules engine 220 and audio data stored in a configurable audio rules engine 222. The evaluation process data may be used in the database 102 for dynamically (i.e., in real time or near real time) modifying the training scenario, as well as stored, as historic data, in the database 206.

Figure 3:
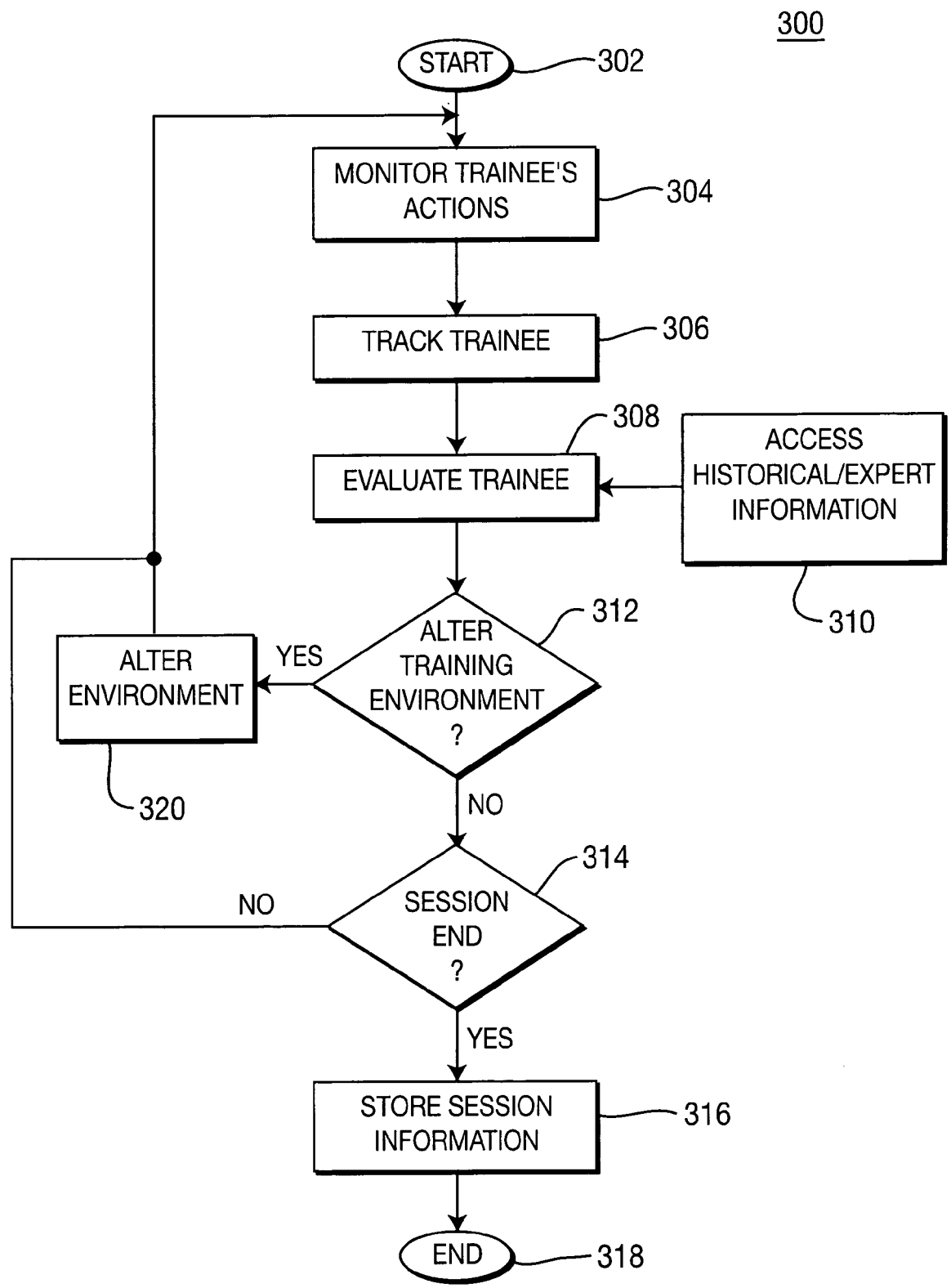
FIG. 3 depicts a flow diagram illustrating a method for operating the system of FIG. 1 in accordance with one embodiment of the present invention.

FIG. 3 depicts a flow diagram illustrating a method 300 for operating the system 100 of FIG. 1. In some embodiments, processing steps of the method 300 are performed in the depicted order. In alternate embodiments, at least two of these steps may be performed contemporaneously or in a different order. To best understand the invention, the reader should simultaneously refer to FIGS. 1 and 3.

The method 300 starts at step 302 and proceeds to step 304, where a trainee's actions are monitored as the trainee performs a training exercise within a training facility. In one embodiment of the invention, the training facility is a physical facility. In another embodiment of the invention, the training facility is synthetic and viewed by the trainee through a three-dimensional helmet mounted viewing system.

At step 304, using the trainee sensors 162 and facility sensors 152, a trainee's actions and response in the training space are monitored using the sensors 162/152 and captured by the input circuit 134. At step 306, the trainee is tracked throughout the training facility. As such, each trainee can be followed throughout the exercise.

At step 308, the trainee's performance during the training session is evaluated using real-time processing of the sensor data against pre-determined performance metrics stored in the database 104. At step 310, the training exercise information database is accessed to provide historical and/or expert information as a metric to compare the trainee's data against. Thus, experts may be used to perform the training exercise to provide a "gold standard". Subsequently, trainee performance can be compared against the gold standard to evaluate and quantify the performance of the trainee. Prior exercises by the trainee may also be used for comparison to determine an improvement metric.

The results of the performance evaluation can be used to improve the performance of the trainee. At step 312, the method 300 queries whether the training environment should be altered in view of the evaluation results. If the query is affirmatively answered, the training environment is altered at step 320. Such alteration may involve, a physical change to the training facility or the obstacles therein. Alternatively, the synthetic objects that are used may be altered to provide a training environment change. These alterations, whether synthetic or physical, can be tailored to address a particular deficiency in the trainee's performance. Thereafter, the method returns to step 304 to continue monitoring the trainee. As such, a closed loop training experience is created wherein the training exercise adapts to fit the trainee's needs as the exercise is performed.

If the query at step 312 is negatively answered, the method proceeds to step 314. At step 314, the method 300 queries whether the training session has ended. If the query is negatively answered, the method 300 proceeds to step 304 and continues trainee monitoring. If the query of step 314 is affirmatively answered, the method 300 proceeds to step 316.

At step 316, information relating to the performed training session is stored (database 106) for future analysis and reference. The results of performed training sessions may be reviewed, annotated, systemized, and become available to on-site and off-site personnel using the query engine and web-based reporting system.

Figure 4:
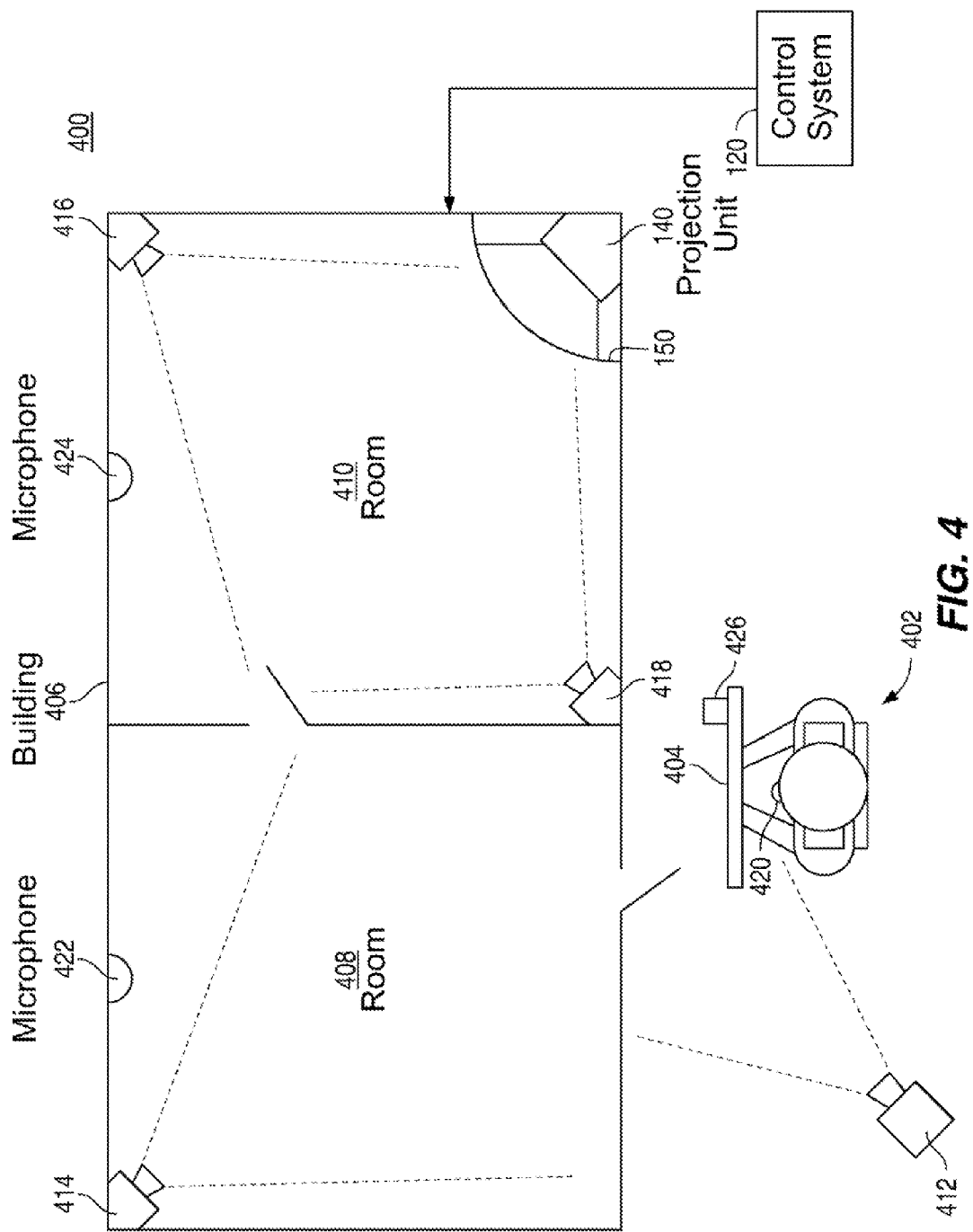
FIG. 4 depicts a training facility that is organized in accordance with one embodiment of the invention.

FIG. 4 depicts a simple view of a training facility 400 that benefits from the present invention. Although the facility 400 is depicted as having two rooms, the depicted space may be part of a larger training facility. The facility 400 may be used for military training, firemen training, police training, and the like. As described above, the system 100 of the present invention may be used in many different training scenarios, and each scenario could be performed in a different facility. The facility 400 is one example of such a facility.

In the exemplary facility 400, the trainee is a policeman 402 carrying a weapon 404. The facility 400 comprises a building 406 having two rooms 408 and 410. To monitor the training exercise, the facility is outfitted with cameras 412, 414, 416, 418 as well as microphones 422, 424. The trainee 400 is outfitted with sensors 420 such as biometric sensors, microphone, head mounted cameras, RFID tags, INS, and the like. The weapon 404 is also outfitted with sensors 426 to monitor its orientation and position.

The training objective, for example, may be to search the rooms 408, 410 and neutralize a criminal (virtual). During the exercise, the trainee 402 is monitored using the sensors, cameras, and microphones. Upon entering room 410, a virtual criminal may be created by the projection unit 140 and displayed on a wall or other portion of the facility. The virtual criminal may interact with the trainee 402 to provide an augmented mixed reality. During the entire exercise, every aspect of the trainee's interaction with the facility is monitored and annotated for future analysis. An analysis and critique of the exercise is rapidly available and the data collected by the system is indexed and stored for further analysis and comparison to other trainees. Additionally, as the training session progresses, the virtual criminal and/or physical attributes of the facility may be altered to test or improve certain aspects of the trainee's behavior. Thus, the training session becomes a closed loop system providing stimulus to the trainee to exercise certain trainee attributes.

While the foregoing is directed to embodiments of the present invention, other and further embodiments of the invention may be devised without departing from the basic scope thereof, and the scope thereof is determined by the claims that follow.

The invention claimed is:

1. A system for monitoring a training environment, comprising:
  at least one first sensor for monitoring a training facility, the at least one first sensor being configured to measure geometric and reflective properties of arbitrary surfaces in the training facility and to compensate for color, texture, and form factor of the surfaces of the training facility by component projectors;
  at least one second sensor, coupled to at least one trainee, for monitoring activities of the at least one trainee;
  a control system, coupled to the at least one first sensor and the at least one second sensor for receiving monitoring data from the at least one first sensor and for receiving monitoring data from the at least one second sensor, respectively, the control system being configured to create two and three dimensional scriptable synthetic objects that comprise static and animated two and three-dimensional images of targets, opponents, and obstacles corresponding to objectives of training exercises, the control system being further configured to providing interaction of the two and three dimensional scriptable synthetic objects to the at least one trainee within the training facility, said control system being further configured to analyze the activities of the at least one trainee by evaluating performance criteria comprising movements, poses and positions of a head, torso, legs and arms of the at least one trainee, and relative movements, poses and positions of the at least one trainee to the two and three dimensional scriptable synthetic objects and positions of real objects based on the monitoring data received from the at least one first sensor and the at least one second sensor, said control system being further configured to process the at least one pose using projective warping so as to produce at least one warped image, the at least one warped image being applied to an occlusion computation to create augmented imagery within a scene from a point of view of the trainee, the augmented imagery being processed to form left and right eye views; and
  the at least one component projector for projecting onto the training facility synthetic, the two and three dimensional scriptable synthetic objects to construct a seamless mixed reality scene comprising both real, live world and projected synthetic world within which the at least one trainee is immersed on a real-time basis, the two and three dimensional scriptable synthetic objects changing in response to the performance of the at least one trainee in the training facility and based on the monitoring data received from the at least one first sensor and the at least one second sensor.

2. The system of claim 1 wherein the control system evaluates a performance of the at least one trainee and alters the training environment in view of the performance evaluation.

3. The system of claim 1 wherein the at least one trainee comprises at least one of an individual, an apparatus operated by the at least one individual, a group of individuals, and a group of apparatuses operated by the group of individuals.

4. The system of claim 1 wherein the at least one second sensor are selected from the group consisting of at least one of a visible marker, an infrared marker, an inertial navigation sensor (INS), a video camera, a microphone, or a radio-frequency tag (RFID).

5. The system of claim 1 wherein the at least one second sensor are used to track the at least one trainee.

6. A computer implemented method of monitoring a training environment, comprising:
  providing at least one first sensor for monitoring a training facility, the at least one first sensor being configured to measure geometric and reflective properties of arbitrary surfaces in the training facility and to compensate for color, texture, and form factor of the surfaces of the training facility by component projectors;
  providing at least one second sensor, coupled to at least one trainee, for monitoring activities of the at least one trainee;
  monitoring the training facility and the activities of the at least one trainee, using a computer processor to perform the steps of:
  receiving monitoring data from the at least one first sensor and receiving monitoring data from the at least one second sensor;
  creating two and three dimensional scriptable synthetic objects that comprise static and animated images of targets, opponents, and obstacles corresponding to objectives of training exercises;
  providing interaction between the two and three dimensional scriptable synthetic objects and the at least one trainee within the training facility;
  analyzing the activities of the at least one trainee by evaluating performance criteria comprising movements, poses and positions of a head, torso, legs and arms of the at least one trainee, and relative movements, poses and positions of the at least one trainee to the two and three dimensional scriptable synthetic objects and positions of real objects based on the monitoring data received from the at least one first sensor and the at least one second sensor;
  processing the at least one pose using projective warping so as to produce at least one warped image, the at least one warped image being applied to an occlusion computation to create augmented imagery within a scene from a point of view of the trainee, the augmented imagery being processed to form left and right eye views; and using the at least one component project to perform the steps of:

projecting onto the training facility the two and three dimensional scriptable synthetic objects to construct a seamless mixed reality scene comprising both real, live world and a projected synthetic world within which the at least one trainee is immersed on a real-time basis, the two and three dimensional scriptable synthetic objects changing in response to the performance of the at least one trainee in the training facility and based on the monitoring data received from the at least one first sensor and the at least one second sensor.

7. The method of claim 6 further comprising tracking the at last one trainee using the at least one second sensor.

8. The method of claim 6 further comprising: evaluating the activities of the at least one trainee.

9. The method of claim 8 further comprising: altering the training environment in view of the evaluation.

10. The method of claim 6 further comprising: analyzing the activities of the at least one trainee and comparing a performance of the at least one trainee with a performance of an expert.

11. The method of claim 6 wherein the at least one trainee comprises at least one of an individual, an apparatus operated by the at least one individual, a group of individuals, and a group of apparatuses operated by the group of individuals.

12. The method of claim 6 wherein the at least one second sensor are selected from the group consisting of at least one of a visible marker, an infrared marker, an inertial navigation sensor (INS), a video camera, a microphone, or a radio-frequency tag (RFID).

13. The apparatus of claim 1, wherein the control system is further configured to evaluate the performance of the at least one trainee in real-time that computes the performance of the at least one trainee from sensor data and a knowledgebase.

14. The apparatus of claim 13, wherein the control system is further configured to optimize and adaptively adjusts stimuli based on training objectives, behavior of the at least one trainee, performance of the at least one trainee, and the history of the stimuli.

15. The apparatus of claim 14, wherein the control system is further configured to adjust training objectives and difficulties based on sensor data in real-time and in subsequent training exercises.

16. The apparatus of claim 15, further comprising an after-action-review (AAR) subsystem that allows instructors and participants to search and retrieve events, behavior of interests, statistics, to replay a training exercise including videos taken and symbolic representation of the exercise and detected events or behaviors, and to provide a report generation function.

17. The apparatus of claim 16, further comprising a database for storing sensor information, performance, training objectives and stimuli for archiving and for providing after-action-review (AAR).

* * * * *